United States Patent Office 2,719,382
Patented Oct. 4, 1955

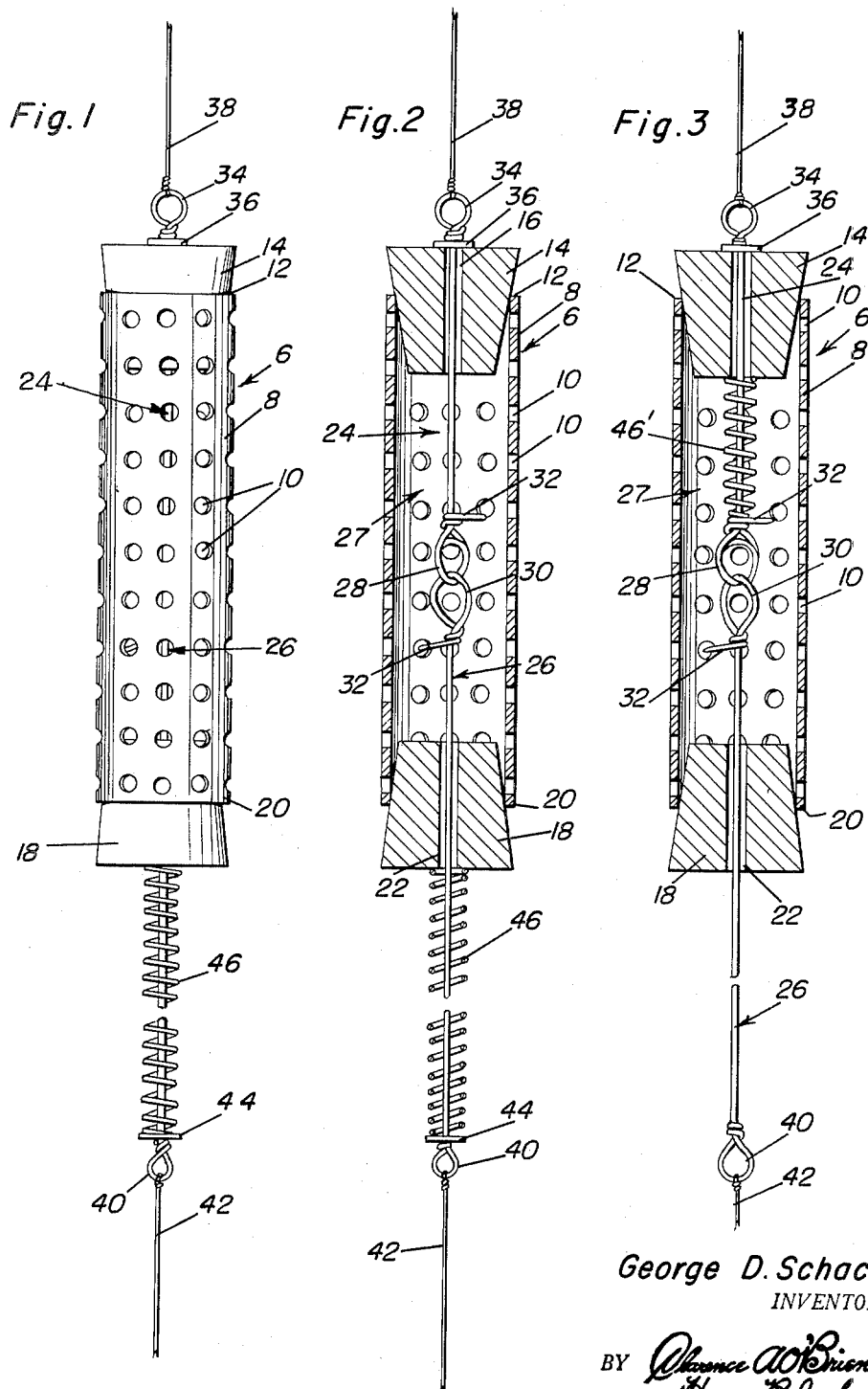

2,719,382

MULTIPURPOSE SINKER

George D. Schachte, Philadelphia, Pa.

Application June 5, 1953, Serial No. 359,880

2 Claims. (Cl. 43—44.99)

The present invention relates to a fishing line attachment and has reference in particular to an attachment which may be classified as a sinker and bait holder combined, the same being herein conveniently entitled a multipurpose sinker.

It will be clear from the preceding statement of the invention that I have evolved and produced a unique structural device which is to be known primarily as a bait container and which, when filled or loaded with the desired bait, is then sufficiently weighted to provide the additional function of a sinker, the same being attached to the end of the fishing line and providing a satisfactory connection for the usual hook-equipped leader.

The preferred embodiment of the invention comprises an elongated rigid open ended tubular body or cylinder having top and bottom closing plugs fitted into and substantially closing the respective open ends, a first rod passing downwardly and slidably through the top plug and into the container space of said body, the upper end of said rod having a fishing line eye, a second rod passing upwardly and slidably through the bottom plug and into said container space, the lower end of said second rod having a leader attaching eye, and the respective adjacent ends of said rods being hingedly connected and having laterally directed stirring and agitating prongs joined thereto.

Other objects, features, and advantages will become more readily apparent from the following description and the accompanying sheet of illustrative drawings.

In the drawings, wherein like numerals are employed to designate like parts throughout the views:

Figure 1 is an elevational view of a bait container and sinker combined;

Figure 2 is a similar view with parts in section and also in elevation, showing the details of their construction, arrangement and association; and, Figure 3 is a view in section and elevation, like Figure 2, and showing a slight modification in respect to the coil spring feature.

Referring now to the drawings by way of reference numerals and accompanying lead lines the tubular body, generally denoted by the numeral 6, is preferably an open ended cylinder. It is within the purview of the invention to have the cylinder closed at one end and open at the other but the construction illustrated is preferred, that is, where both ends are open. The cylinder, also the body broadly speaking, is denoted specifically by the numeral 8 and it is provided with a multiplicity of perforations or holes 10 through which the oil, water and particles of bait exude. The upper end 12 is substantially closed by a rubber or cork plug 14, called the top plug. This is a truncated-conical plug and is fitted frictionally into and thus closes said end 12. There is a central passage or bore 16 passing through the plug. A similar truncated-conical plug, called the bottom plug, is provided and this is denoted by the numeral 18 and is friction held in and substantially closes the lower end 20. Here again this plug 18 is provided with a central passage 22.

The rod means is sectional. As a matter of fact, it is made up of two companion or complemental individual rods, the upper one being denoted by the numeral 24 and the lower one by the numeral 26. Both rods are rigid but the upper rod is generally shorter than the lower one and in fact the lower one is of a length greater than the combined length of the body or cylinder plus the projecting portion of said bottom plug in the manner shown in the drawings. The upper rod 24 extends downwardly through the passage 16 and into the container space 27 of the cylinder where it terminates in a loop 28 hinged to or linked with a complemental loop 30 on the upper end of the lower rod 26. The lower rod passes upwardly through the passage 22 and into the space 27. The loops are formed by bending the end of the rod and twisting it around the rod proper so that the terminal portions extend and provide lateral stirring and agitating prongs 32—32. There is an eye 34 on the upper end of the upper rod 24 and also a stop washer or shoulder 36 which abuts the plug 14. This eye 34 serves to accommodate a fishing line 38. The lower rod also terminates in an eye 40 to which the leader 42 is connected. There is a stop shoulder or washer at 44. In the arrangements shown in Figures 1 and 2 the coil spring, a return-type spring, is denoted by the numeral 46 and it encircles the protruding end portion of the rod 26 and is interposed between the shoulder 44 and the adjacent end of the lower plug 18 as shown.

In the modification seen at the right in Figure 3, the coil spring instead of being on the exterior of the container body is confined within the limits of the space 27. This coil spring is conveniently referred to by the numeral 46' and it encircles the lower end portion of the rod 24 and it is interposed between the lower end of the upper plug 14 and the adjacent prong 32.

The use of a spring, either as mounted inside the top end of the cylinder, or outside it at the bottom, between the bottom plug and the lower eye of the brass rod or wire, would serve only to return the internal agitator loops and prongs to their normal position. Motion to them, for the purpose of agitating the bait and making it impossible for the water currents to dissipate it, is imparted by jerking of the line.

It will be clear then that the device depends upon manual action to agitate the bait, and the spring force merely to return the agitator to normal position within the container space of the cylinder. Dissipation of the bait depends solely upon water current through the holes of the container or "pot," and/or the action of the fisherman's drawing the pot through the water. There is no plunger in fact or in effect, and no accompanying mechanical force either to force the bait out of the container, or to draw it out from action outside of the pot. The agitator serves only to keep the bait from clogging, thereby permitting proper and desired escape and distribution of the bait by water and line actions as mentioned.

The compression type spring, whether used inside the upper end of the cylinder as presently mounted, or outside and below the lower end, would be of such size and strength as to meet the requirements of the size and weight of the chum cylinder involved.

It will be clear that the linking or hinging connection between the rod serves to facilitate loading bait, usually ground fish, called chum, in the container space. Thus, the loops 28 and 30 and prongs 32 are not only agitating elements, they provide a hinged joint between the respective rods 24 and 26. They permit the upper rod 24 to be pulled upwardly and through the upper end after the upper plug is dislodged whereupon said rod may then be folded down on the hinged joint along side the cylinder and with the loops 28 and 30 hung over the upper edge 12, placing the then withdrawn upper rod 24 in an outof-the-way position along side of the cylinder to facilitate loading bait into the chamber or container space.

The cylinder or body when filled with chum, will weigh up to ten ounces or so in the regular sized form and it therefore serves not only as an enticing bait holder but also as a sinker.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A multipurpose fishing device comprising an elongated rigid open ended tubular body having a multiplicity of perforations provided therein from end to end, top and bottom closing plugs fitted removably into and substantially closing the respective open ends to provide a container space therebetween, a portion of said bottom plug projecting outwardly and beyond the bottom of said body, a first rod passing downwardly and slidably through the top plug and into said container space, the upper end of said rod having a fishing line eye, a second rod passing upwardly and slidably through the bottom plug and into said container space, the lower end of said second rod having a leader attaching eye, and the respective adjacent ends of said rods within said container space being hingedly connected, one with the other, and said hingedly connected ends having laterally disposed bait stirring and agitating prongs joined thereto, said second rod being of an over-all length greater than the combined length of the body and projecting portion of said bottom plug, whereby said first rod may be wholly withdrawn to the point where the hinged connection is then outwardly of one open end of the body, permitting said rods to fold and so that the withdrawn rod may be pivoted and dropped over and allowed to hang outside the body in an out-of-the-way position, with the top plug intentionally removed from said body and to thus assist the user in filling the container space with chum or the like.

2. A multipurpose fishing device comprising an elongated rigid open ended tubular body having a multiplicity of perforations therein and spaced apart and ranging from one end of said body to the other end thereof, top and bottom closing plugs fitted removably into and substantially closing the respective open ends to provide a container space therebetween, a first rod passing downwardly and slidably through the top plug and into said container space, the upper end of said rod having a fishing line eye, a second rod passing upwardly and slidably through the bottom plug and into said container space, the lower end of said second rod having a leader attaching eye, and the respective adjacent ends of said rods within said container space being provided with looped ends hingedly linked together, each loop having a terminal extremity laterally bent and providing a stirrer and agitator prong and the combination therewith of a coil spring encircling one rod and bearing against the adjacent plug, said coil spring being located wholly outside of said container space.

References Cited in the file of this patent

UNITED STATES PATENTS

| | | |
|---|---|---|
| 711,318 | Hymers | Oct. 14, 1902 |
| 1,393,617 | Frame | Oct. 11, 1921 |
| 1,466,620 | Guy | Aug. 28, 1923 |
| 1,816,725 | Freeman | July 28, 1931 |
| 1,941,370 | Vann | Dec. 26, 1933 |
| 2,532,879 | Baker | Dec. 5, 1950 |

FOREIGN PATENTS

| | | |
|---|---|---|
| 7,807 | Great Britain | 1886 |
| 805,484 | France | Aug. 22, 1936 |